United States Patent
Taylor et al.

(10) Patent No.: US 10,214,227 B1
(45) Date of Patent: Feb. 26, 2019

(54) LEVER ASSIST FOR TRANSPORT DOLLY

(71) Applicants: Nick Taylor, Stafford, VA (US); Rick Scriven, Stafford, VA (US); James McShane, Erie, PA (US)

(72) Inventors: Nick Taylor, Stafford, VA (US); Rick Scriven, Stafford, VA (US); James McShane, Erie, PA (US)

(*) Notice: Subject to any disclaimer, the term of this patent is extended or adjusted under 35 U.S.C. 154(b) by 0 days.

(21) Appl. No.: 15/672,890

(22) Filed: Aug. 9, 2017

(51) Int. Cl.
*B62B 1/10* (2006.01)
*B62B 5/00* (2006.01)
*B62B 3/00* (2006.01)

(52) U.S. Cl.
CPC .............. *B62B 1/10* (2013.01); *B62B 5/0026* (2013.01); *B62B 5/0086* (2013.01); *B62B 3/002* (2013.01); *B62B 2203/05* (2013.01)

(58) Field of Classification Search
CPC .......... B62B 1/10; B62B 1/12; B62B 5/0026; B62B 5/0086; B62B 3/002; B62B 2203/05; B62B 2203/50

USPC ................. 280/47.27, 47.28, 47.29
See application file for complete search history.

(56) References Cited

U.S. PATENT DOCUMENTS

| | | | | |
|---|---|---|---|---|
| 3,035,727 A | * | 5/1962 | Turner | B62B 1/14 280/47.27 |
| 6,237,925 B1 | * | 5/2001 | Koenig | B62B 1/12 280/47.28 |
| 6,273,438 B1 | * | 8/2001 | Prapavat | B62B 1/002 280/47.2 |
| 8,235,401 B1 | * | 8/2012 | Scriven | B62B 1/12 280/47.17 |
| 9,096,251 B2 | | 8/2015 | Bowden | |

* cited by examiner

*Primary Examiner* — John D Walters
(74) *Attorney, Agent, or Firm* — Richard K. Thomson

(57) ABSTRACT

A foot lever assist mechanism permits transport dollies to be more heavily loaded, saving the worker additional trips to deliver the entire supply. The lever assist may be configured to move from dolly to dolly, being secured by a pair of thumb screws or welded in place, secured to the axle. An auxiliary feature of this lever assist is the provision of a telescoping ladder-like extender and an extra long base which maximizes the advantage this foot lever assist mechanism provides.

22 Claims, 6 Drawing Sheets

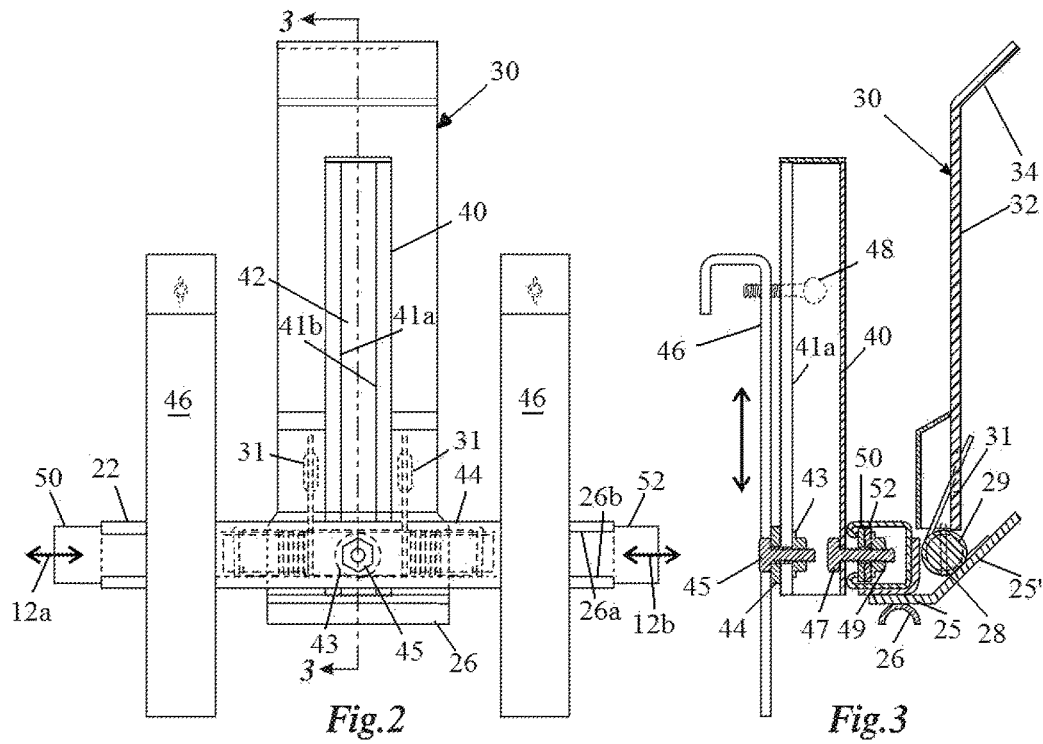
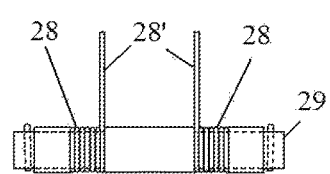 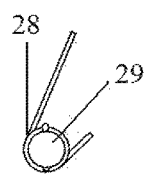
Fig.4A    Fig.4B

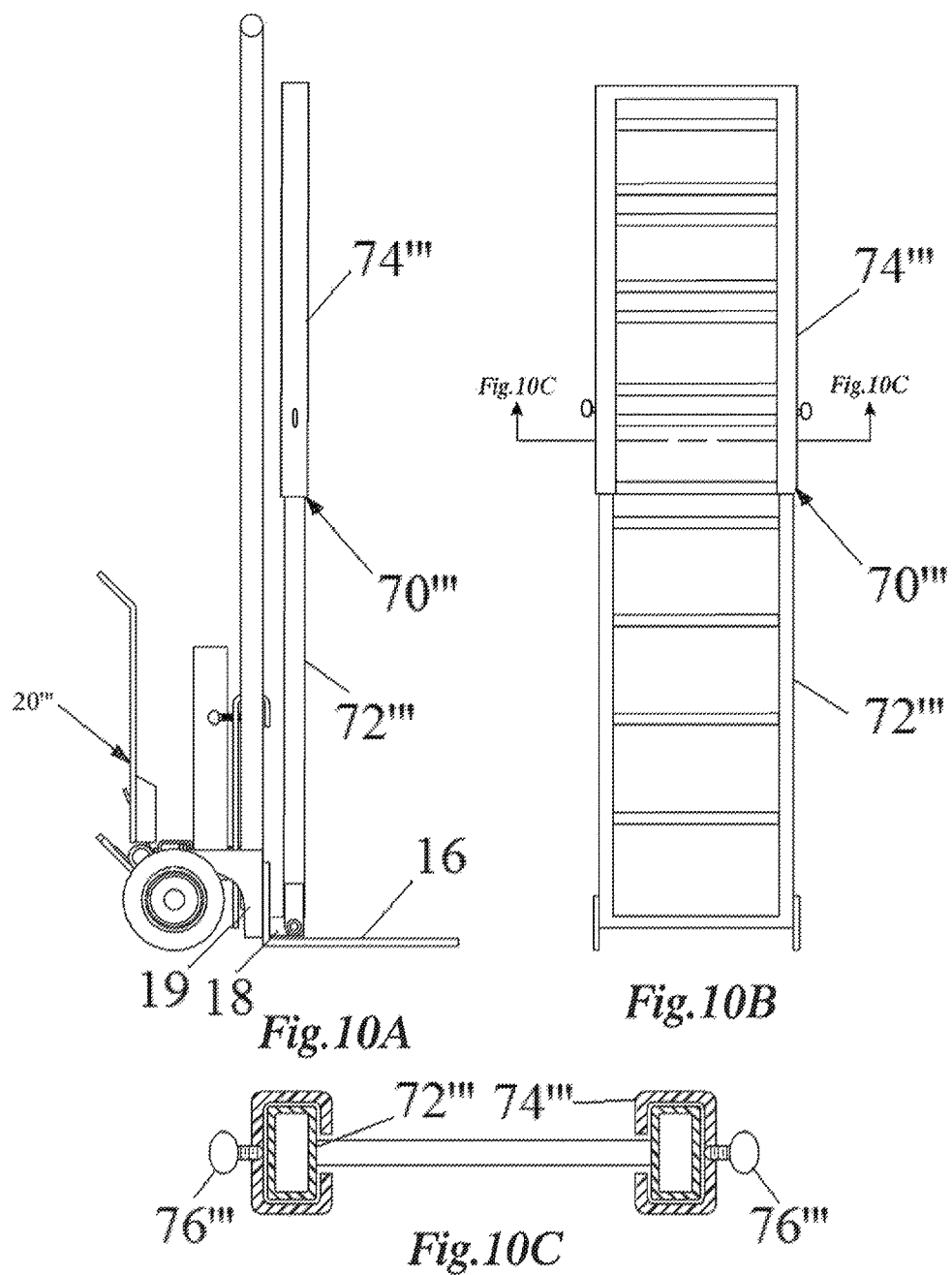

LEVER ASSIST FOR TRANSPORT DOLLY

BACKGROUND AND SUMMARY OF THE INVENTION

The present invention is directed to the field of transport dollies. More particularly, the present invention is directed to a foot lever to assist transport dolly manipulation, particularly when heavily loaded.

Transport dolly operators such as the drivers of beer, soda, and water delivery trucks, get paid either by the hour or based on the number of deliveries made in a day. Accordingly, the dolly operators would like to make as few trips as possible to off-load the products at a particular stop. Hence, if at all possible, it would be beneficial to stack the entire delivery on the dolly and make a single visit into the commercial establishment. The major impediment to achieving this objective is the initial "rock back" movement needed to enable the load to be balanced on the wheels of the dolly. Once this impediment has been overcome, the large dolly load can be readily maneuvered or "horsed" into the store by virtue of the mechanical advantage afforded by the wheels.

Applicant's earlier invention disclosed and claimed in U.S. Pat. No. 8,235,401 entitled "Lever Assist for a Transport Dolly" is significantly advantageous in achieving this objective for the specialized transport dolly for outboard motors for which it was designed. As noted therein "Clever Lever I" enables a petite 120 woman to move a 350 lb motor from point A to point B. However, even if the "Clever Lever I" was re-designed to adapt to a conventional dolly, for a large beverage distributor or furniture mover, the prospect of scrapping their existing inventory of dollies in order to overcome the hurdles associated with those dollies is considered by many, to be cost-prohibitive.

Accordingly, it is among the objects of the present invention to provide a separate lever assist device capable of being attached to a dolly for a day, month, or life of the dolly and/or moved between a first dolly and a second without the need to replace the dolly. A second embodiment provides a permanently attached lever assist that is superior to similar existing devices. Lastly, a ladder-like extension and extended base plate, which can optionally be provided with an adjustable extension feature, enables the dolly to be loaded beyond anything currently capable with a standard angled base support. As an additional enhancement, the ladder-like member may be coated with pink to promote breast cancer awareness. Due to the difficulty of the "tilt-back" problem, the beverage delivery business is dominated by men. The addition of the "Clever Lever" of the present invention to dollies creates an equalizer that makes delivery truck jobs a whole new ball game for women.

A first feature of the present invention is a foot-operated lever assist mechanism for use on a dolly which has a laterally extending axle mounting a plurality of wheels, the mechanism comprising: a) a laterally extending channel member that extends parallel to the axle of the dolly; b) an angle iron having a horizontal face secured to a bottom surface of the channel member and an angulated face extending at an obtuse angle relative to the horizontal face; c) a foot lever having a vertically extending portion and an angulated portion engageable by a user's foot; d) spring means operable between the vertically extending portion of the foot lever and the angulated face of the angle iron; e) means to secure the foot-operated lever assist mechanism to a dolly, the means to secure including means to engage the laterally extending axle of the dolly. The means to engage the laterally extending axle can comprise an arcuate member which sits atop the axle. One means to engage the laterally extending axle may comprise a series of welds which secures the lever assist mechanism to the dolly.

Alternatively, he foot-operated lever assist mechanism may include a vertical post secured to the longitudinal channel member, the vertical post being adjustably secured to the laterally extending channel member. A pair of hangar arms are attached to the vertical post, the pair of hangars forming the means to secure the foot-operated lever to the dolly. An additional feature of the lever assist mechanism may include an extension member pivotally connected to a horizontally extending portion of the dolly. The extension member may consist of a telescopic mechanism allowing a length of the extension member to be adjusted.

A second feature of the present invention comprises a foot-operated lever assist mechanism for use on a dolly which has a horizontal axle mounting a plurality of wheels, said mechanism including: a) a longitudinal channel member that extends parallel to the axle of the dolly; b) an angle iron having a horizontal face secured to a bottom surface of the channel member and an angulated face extending at an obtuse angle relative to the horizontal face; c) a foot lever having a vertically extending portion and an angulated portion engageable by a user's foot; d) spring means operable between the vertically extending portion of the foot lever and the angulated face of the angle iron; e) a vertical post secured to the longitudinal channel member; f) a pair of hangar arms attached to the vertical post, the pair of hangars forming means to removably secure the foot-operated lever to the dolly allowing the foot-operated lever assist mechanism to be moved from one dolly to another. Each of the pair of hangar arms has a thumb screw threadably attached thereto allowing it to be secured to a horizontal support on the dolly.

A third feature of the present invention comprises a foot-operated lever assist mechanism for use on a hand truck or dolly which has a horizontal axle mounting a plurality of wheels, the mechanism including: a) a longitudinal channel member that extends parallel to the axle of the dolly; b) an angle iron having a horizontal face secured to a bottom surface of the channel member and an angulated face extending at an obtuse angle relative to the horizontal face; c) a foot lever having a vertically extending portion and an angulated portion engageable by a user's foot; d) spring means operable between the vertically extending portion of the foot lever and the angulated face of the angle iron; e) an extension member pivotally connected to a horizontally extending portion of the dolly movable from a vertical, collapsed idle position to a horizontally extended loadable position. The extension member includes a first element pivotally attached to a horizontally extending portion of the dolly and a second member telescopically engaging said first member. A securing means is included to fix the second member with respect to the first member. The foot-operated lever assist mechanism includes a camming member attached to said foot-operated lever assist mechanism facilitating climbing steps with a fully loaded hand truck.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 2 is a front view of the first embodiment;

FIG. 3 is a cross-sectional side view of the first embodiment taken along line 3-3 in FIG. 2;

FIG. 4A is a front view of the spring mechanism of the foot lever;

FIG. 4B is a side view of the spring mechanism;

FIG. 10A is a side view of a fourth embodiment featuring an auxiliary base extension in a folded position;

FIG. 10B is a front view of the auxiliary base extension of the fourth embodiment; and, FIG. 10C is a cross-sectional bottom view of the auxiliary base extension of the fourth embodiment taken along line 10C-10C in FIG. 10B.

DETAILED DESCRIPTION OF THE PREFERRED EMBODIMENT(S)

Figure 1:
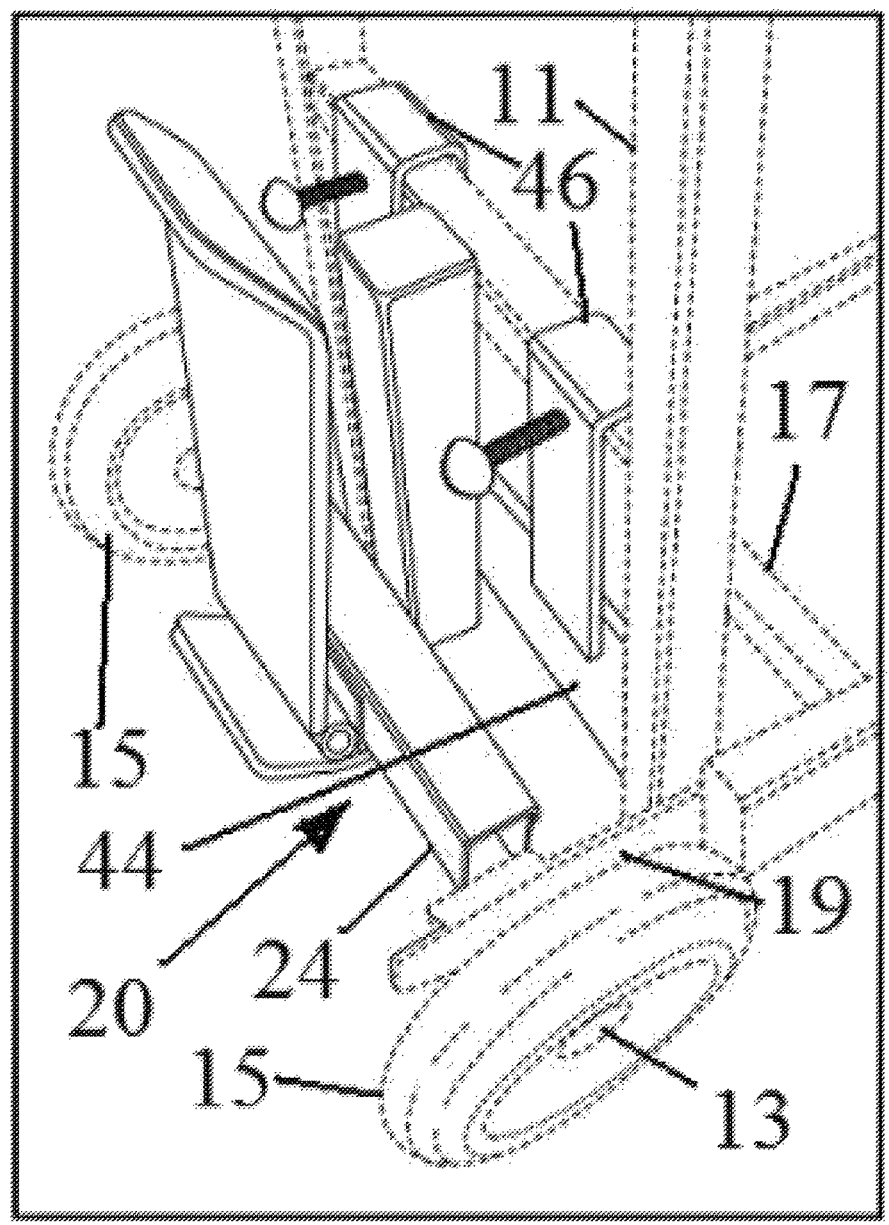
FIG. 1 is a rear perspective view of a first embodiment of the lever assist mechanism of the present invention.

A first embodiment of the foot-operated lever assist member of the present invention is depicted in FIGS. 1-3 generally at 20. Foot-operated lever assist member 20 is secured to a transport dolly 11 which has a horizontal axle 13 which mounts a plurality of wheels 15, said plurality being most often, two. In the embodiment shown in FIGS. 1-7, longitudinal channel member 22 extends parallel to the axle 13 and has an element 24 (FIG. 3) for engaging the axle 13 transferring the load which the lever assist 20 experiences to the axle 13. Some other lever assist devices transfer the load to some skimpy metal strips. While this type of assembly may be suitable for the relatively light loads with which the mechanism in question is designed to be used, such a configuration would be entirely inadequate for the heavy-duty usage envisioned for the present invention.

A first leg 25 of angle iron 26 is welded to the bottom edge 23 of channel member 22. Second leg 25' forms an obtuse angle of around 135° with first leg 25. A pair of coil springs 28, wrapped around mounting pin 29, mount foot lever 30 to second leg 25' and bias it to an upright position where it is out of the transport dolly handler's leg-swing path. Other prior art foot levers which are fixed to extend toward the handler pose a significant risk for her/his shins. In addition, such foot levers make it virtually impossible to pull a loaded hand truck backwards up a series of steps. Foot lever 30 includes a first vertically extending portion 32 and a second rearwardly angled portion 34 which facilitates engagement by the handler's foot. Distal ends 28' of springs 28 extend through slots 31 in foot lever 30 as best seen in FIGS. 2 and 3. Attachment of angle iron 26 to the bottom edge 23 of channel member 22 is made somewhat more secure by intermediate member 27 being welded both to the bottom edge 23 as well as the rear surface 21 of channel 22 and the upper surface of angle iron 26.

The first embodiment of lever assist 20 depicted in FIGS. 1-7, is adapted to be transferred from dolly to dolly, as needed. Further, it is configured to be adjusted to fit various sizes of hand trucks. As best seen in FIGS. 1-3, lever assist 20 includes a vertical column 40 which has a channel 42 that opens toward the front. Bolt 45 extends into channel 42 with washer 43 engaging rolled rims 41a, 41b thereby attaching laterally extending plate 44 to vertical column 40, to which two hangars 46 are welded. Each hangar 46 has a thumb screw 48 which can be tightened on to a lateral support member 17 of dolly 11. A pair of stabilizer plates 50, 52 are adjustably held in place by bolt 47 and nut 49. By loosening the bolt/nut duo 47/49, stabilizer plates 50, 52 can be adjusted as indicated by arrows 12a, 12b sliding behind the rolled rims 26a, 26b in channel 22 to engage lateral walls 19 of dolly 11 (FIG. 1). Bolt 45 is adjustably secured in channel 42 to permit hangars 46 to be attached to lateral support 17 while element 24 sits atop axle 13. It will be understood that different styles of dollies will have varying distances between lateral support 17 and axle 13.

Figure 5:
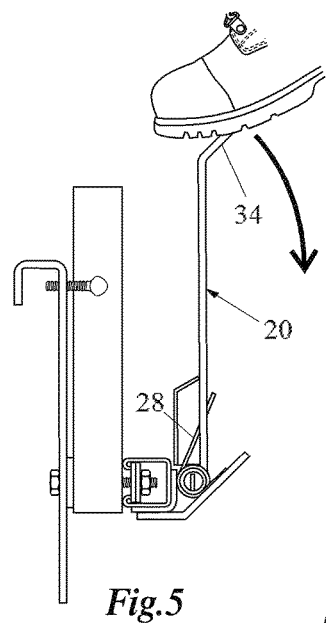
FIG. 5 is a schematic depiction of the initial engagement of the lever by the user's foot.
Figure 6:
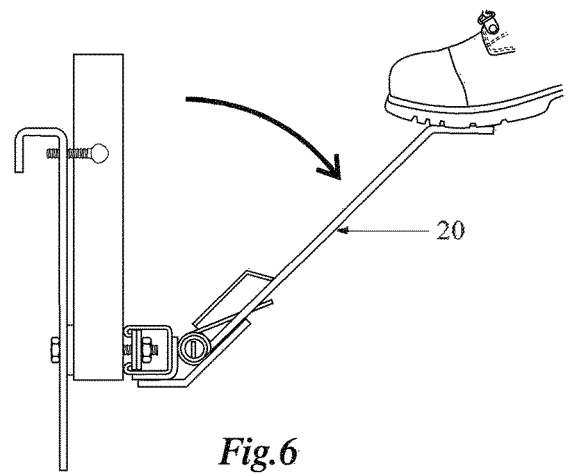
FIG. 6 is a schematic depiction of the spring being fully extended.
Figure 7:
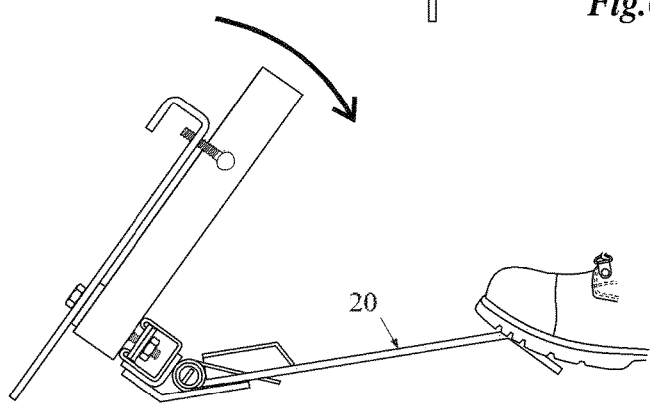
FIG. 7 is a schematic depiction of the foot lever having moved the load over the dolly's wheels.

The mode of operation of the lever assist 20 is depicted in conjunction with FIGS. 5-7. While engaging the handles of the dolly, the hand truck operator engages the rearwardly angled portion 34 with her/his foot, pressing downward against the bias of springs 28 bringing the previously vertically extending portion 32 or foot lever 30 into engagement with second leg 25' of angle iron 26 (FIG. 6). Additional pressure on the foot lever 30 causes the lever assist 20 and the dolly to which it is attached to rotate the load over the wheels for transport (FIG. 7). Tests indicate that by employing the lever assist 20 of the present invention with a dolly loaded with 18 cases of water, the user needed apply only 15 pounds of pressure to the handles, in addition to the weight supplied to the foot lever 30. This amounts to over a 90% reduction in pull force needed, greatly facilitating the movement of even the largest loads and, indeed, enables the operator to contemplate moving loads previously thought impossible to manipulate.

Figure 8:
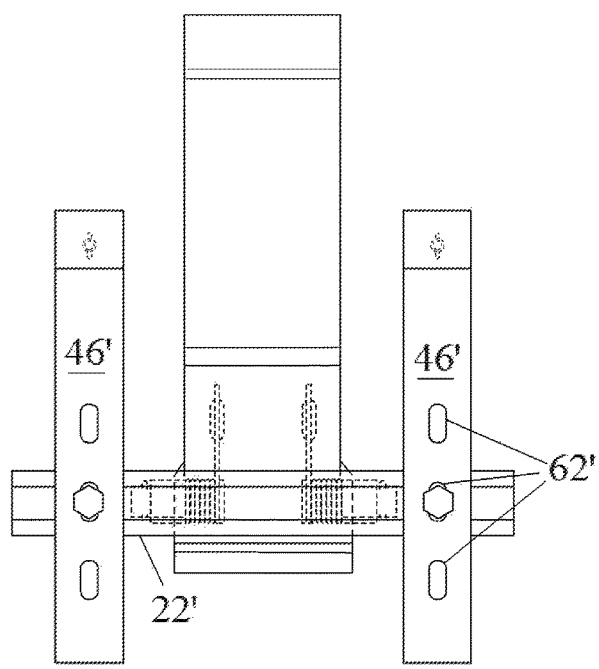
FIG. 8 is a front view of a second embodiment.
Figure 9:
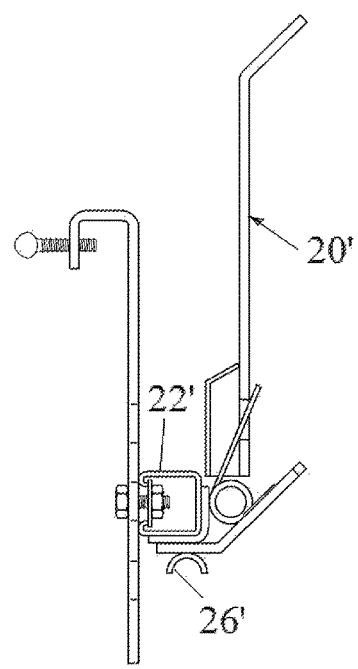
FIG. 9 is a side view of the second embodiment.

The second embodiment shown in FIGS. 8 and 9 eliminate the vertical column and simply attach the hangars 46' directly to lateral channel 22' using one of three throughbores 62', the positions of which will be chosen to accommodate the three most prevalent sizes of dollies. As depicted therein the thumb screws for hangars 46' may engage the lateral support of the dolly from the opposite side without departing from the scope of the invention.

Figure 10:
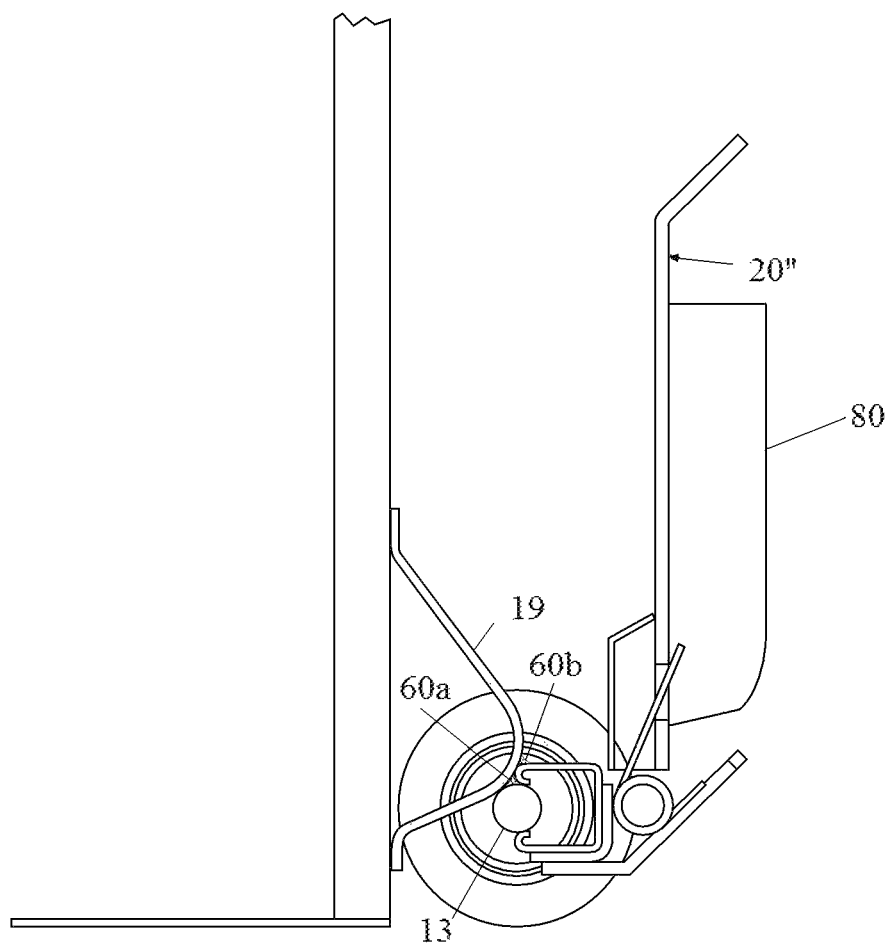
FIG. 10 is a side view of a third embodiment.

While these first two embodiments have been made as separate entities from the hand truck with which they are designed to be used, it is believed that once the value of the foot lever assist 20 of the present invention becomes apparent, users will want them permanently mounted on their hand trucks. Accordingly, the the embodiment depicted in FIG. 10 shows the foot lever 20" welded at 60a and 60b to the axle 13 and the frame 19, respectively. Additionally depicted in FIG. 10 is a feature that may be incorporated in any of the embodiments detailed herein. A camming wedge 80 may be attached to the back side of the foot lever assist 20" allowing the loaded dolly to be cammed up a curb. The wedge 80 is preferably made of a self-lubricating plastic material such as HDPE to facilitate both sliding and lifting of the load. By placing a plurality of holes vertically situated on the inner edge of the wedge, additional camming material can be exposed along the bottom as the plastic is sacrificially worn off.

A fourth embodiment of the foot lever assist of the present invention is depicted in FIGS. 10A-10C generally at 20‴. A standard hand truck has a loadable foot of 8" in length. In this fourth embodiment an extended foot 16 of 18" is provided. This extended foot alone significantly amplifies the leverage afforded by the foot lever assist 20‴. Extended foot 16 is secured to side walls 19. Extended foot 16 is provided with a pair of protruding ears 18 to which a telescoping extension 70''' may be pivotally attached. Ladder-like, telescoping extension 70''' may be pivoted from a vertical, collapsed idle position (FIG. 10A) to a horizontally extended loadable position. First section 72''' is pivotally secured to ears 18 while second section 74''' telescopes thereon (FIG. 10C). A pair of thumb screws 76''' are utilized to hold section 74''' in a desired position relative to section 72'''. While ladder-like extension may have whatever length desired, it is envisioned that when collapsed, extension 70''' would provide a loadable length of a bit more than 36" to provide room for the length of two cases or the width of three, and that fully extended, the extension would provide a surface that is 48" in length to accommodate four case widths which, of course, may be additionally stacked 4 cases (or more) high. The use of bungee cords or other securement means is recommended when attempting to move ultra large stacks of beverage cases. While the leverage afforded by the foot lever assist of the present invention will provide the handler with the capability to move large stacks, the handler will initially be advised to use caution until her/his ability to maneuver large stacks catches up to the capability s/he has been afforded by this device.

An added feature of the present invention is that the ladder-like extension 70''' can be painted pink to promote breast cancer awareness. As mentioned supra, the use of the "Clever Lever" of the present invention will enable women to compete in a male dominated industry by providing them the mechanical advantage necessary for women to move these heavy loads.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A foot-operated lever assist mechanism for use on a dolly which has a laterally extending axle mounting a plurality of wheels, said mechanism comprising:
   a) a laterally extending channel member that extends parallel to the axle of the dolly;
   b) an angle iron having a horizontal face secured to a bottom surface of said channel member and an angulated face extending at an obtuse angle relative to said horizontal face;
   c) a foot lever having a vertically extending portion and an angulated portion engageable by a user's foot;
   d) spring means operable between said vertically extending portion of said foot lever and said angulated face of said angle iron to bias said vertically extending portion to an upright position;
   e) means to secure said foot-operated lever assist mechanism to a dolly, said means to secure including means to engage the laterally extending axle of the dolly, wherein said means to engage the laterally extending axle comprises a series of welds which secures said lever assist mechanism to said dolly.

2. The foot-operated lever assist mechanism of claim 1 further comprising an extension member pivotally connected to a horizontally extending portion of the dolly.

3. The foot-operated lever assist mechanism of claim 2 wherein said extension member is telescopic allowing a length of said extension member to be adjusted.

4. The foot-operated lever assist mechanism of claim 1 further comprising a camming member attached to said foot-operated lever assist mechanism facilitating climbing of a curb with a fully loaded hand truck.

5. A foot-operated lever assist mechanism for use on a dolly which has a laterally extending axle mounting a plurality of wheels, said mechanism comprising:
   a) a laterally extending channel member that extends parallel to the axle of the dolly;
   b) an angle iron having a horizontal face secured to a bottom surface of said channel member and an angulated face extending at an obtuse angle relative to said horizontal face;
   c) a foot lever having a vertically extending portion and an angulated portion engageable by a user's foot;
   d) means operable between said vertically extending portion of said foot lever and said angulated face of said angle iron to bias said foot lever to an upright position;
   e) means to secure said foot-operated lever assist mechanism to a dolly, said means to secure including means to engage the laterally extending axle of the dolly,
   f) a vertical post secured to said longitudinal channel member.

6. The foot-operated lever assist mechanism of claim 5 wherein said means to engage the laterally extending axle comprises an arcuate member which sits atop the axle.

7. The foot-operated lever assist mechanism of claim 5 wherein said vertical post is adjustably secured to said laterally extending channel member.

8. The foot-operated lever assist mechanism of claim 5 wherein a pair of hangar arms are attached to said vertical post, said pair of hangars comprising said means to secure said foot-operated lever to said dolly.

9. The foot-operated lever assist mechanism of claim 5 wherein said means to engage the laterally extending axle comprises a series of welds which secures said lever assist mechanism to said dolly.

10. The foot-operated lever assist mechanism of claim 5 further comprising an extension member pivotally connected to a horizontally extending portion of the dolly.

11. The foot-operated lever assist mechanism of claim 10 wherein said extension member is telescopic allowing a length of said extension member to be adjusted.

12. The foot-operated lever assist mechanism of claim 5 further comprising a camming member attached to said foot-operated lever assist mechanism facilitating climbing of a curb with a fully loaded hand truck.

13. A foot-operated lever assist mechanism for use on a dolly which has a horizontal axle mounting a plurality of wheels, said mechanism comprising:
   a) a longitudinal channel member that extends parallel to the axle of the dolly;
   b) an angle iron having a horizontal face secured to a bottom surface of said channel member and an angulated face extending at an obtuse angle relative to said horizontal face;
   c) a foot lever having a vertically extending portion and an angulated portion engageable by a user's foot;
   d) means operable between said vertically extending portion of said foot lever and said angulated face of said angle iron to bias said foot lever to an upright position;
   e) a vertical post secured to said longitudinal channel member;
   f) a pair of hangar arms attached to said vertical post, said pair of hangars forming means to removably secure said foot-operated lever to said dolly allowing said foot-operated lever assist mechanism to be moved from one dolly to another.

14. The foot-operated lever assist mechanism of claim 13 further comprising a thumb screw threadably attached to each member of said pair of hangar arms.

15. The foot-operated lever assist mechanism of claim 13 further comprising a camming member attached to said foot-operated lever assist mechanism facilitating climbing of a curb with a fully loaded hand truck.

16. A foot-operated lever assist mechanism for use on a hand truck or dolly which has a horizontal axle mounting a plurality of wheels, said mechanism comprising:
   a) a longitudinal channel member that extends parallel to the axle of the dolly;
   b) an angle iron having a horizontal face secured to a bottom surface of said channel member and an angulated face extending at an obtuse angle relative to said horizontal face;
   c) a foot lever having a vertically extending portion and an angulated portion engageable by a user's foot;
   d) spring means operable between said vertically extending portion of said foot lever and said angulated face of said angle iron to bias said foot lever to an upright position;
   e) an extension member pivotally connected to a horizontally extending portion of the dolly movable from a vertical, collapsed idle position to a horizontally extended loadable position, said extension member including a first element pivotally attached to a horizontally extending portion of the dolly and a second member telescopically engaging said first member.

17. The foot-operated lever assist mechanism of claim 16 further comprising securing means to fix said second member with respect to said first member.

18. The foot-operated lever assist mechanism of claim 11 further comprising a camming member attached to said foot-operated lever assist mechanism facilitating climbing of a curb with a fully loaded hand truck.

19. A foot-operated lever assist mechanism for use on a dolly which has a laterally extending axle mounting a plurality of wheels, said mechanism comprising:
   a) a laterally extending channel member that extends parallel to the axle of the dolly;
   b) an angle iron having a horizontal face secured to a bottom surface of said channel member and an angulated face extending at an obtuse angle relative to said horizontal face;
   c) a foot lever having a vertically extending portion and an angulated portion engageable by a user's foot;
   d) spring means operable between said vertically extending portion of said foot lever and said angulated face of said angle iron to bias said foot lever to an upright position;
   e) means to secure said foot-operated lever assist mechanism to a dolly, said means to secure including means to engage the laterally extending axle of the dolly;
   f) an extension member pivotally connected to a horizontally extending portion of the dolly.

20. The foot-operated lever assist mechanism of claim 19 wherein said extension member is telescopic allowing a length of said extension member to be adjusted.

21. The foot-operated lever assist mechanism of claim 20 further comprising a camming member attached to said foot-operated lever assist mechanism facilitating climbing of a curb with a fully loaded hand truck.

22. A foot-operated lever assist mechanism for use on a hand truck or dolly which has a horizontal axle mounting a plurality of wheels, said mechanism comprising:
   a) a longitudinal channel member that extends parallel to the axle of the dolly;
   b) an angle iron having a horizontal face secured to a bottom surface of said channel member and an angulated face extending at an obtuse angle relative to said horizontal face;
   c) a foot lever having a vertically extending portion and an angulated portion engageable by a user's foot;
   d) means operable between said vertically extending portion of said foot lever and said angulated face of said angle iron to bias said foot lever to an upright position;
   e) an extension member pivotally connected to a horizontally extending portion of the dolly movable from a vertical, collapsed idle position to a horizontally extended loadable position,
   f) a camming member attached to said foot-operated lever assist mechanism facilitating climbing of a curb with a fully loaded hand truck.

\* \* \* \* \*